(12) United States Patent
Sporn

(10) Patent No.: US 6,775,205 B1
(45) Date of Patent: Aug. 10, 2004

(54) WRIST-BORNE RADIOTELEPHONE SET

(76) Inventor: Joseph S. Sporn, 274 W. 86th St., New York, NY (US) 10024

( * ) Notice: Subject to any disclaimer, the term of this patent is extended or adjusted under 35 U.S.C. 154(b) by 879 days.

(21) Appl. No.: 08/971,647

(22) Filed: Nov. 17, 1997

(51) Int. Cl.[7] .................. G04B 47/00; G04B 47/02; H04M 1/00
(52) U.S. Cl. ............... 368/10; 368/13; 379/433.02; 379/433.1
(58) Field of Search ................... 368/10, 13, 282, 368/281, 278; 379/433, 343, 433.01, 433.02, 433.1

(56) References Cited

U.S. PATENT DOCUMENTS

| | | | | |
|---|---|---|---|---|
| 5,239,521 A | * | 8/1993 | Blonder .................. | 368/10 |
| 5,511,120 A | * | 4/1996 | Hirata et al. ............ | 379/343 |
| 5,659,611 A | * | 8/1997 | Saksa .................... | 379/433 |
| 5,684,883 A | * | 11/1997 | Chen ..................... | 381/107 |
| 5,721,775 A | * | 2/1998 | Liefer .................... | 379/430 |

\* cited by examiner

Primary Examiner—Vit Miska
(74) Attorney, Agent, or Firm—Richard W. Hanes; Hanes & Schutz, P.C.

(57) ABSTRACT

A radiotelephone set in which a case housing a miniature microwave transceiver is strapped to the wrist of a user's hand, a microphone mounted on the strap being connected to the transceiver input whereby when the hand is raised to bring the microphone adjacent the user's mouth, the user can then transmit voice messages. An earphone placed within a finger thimble is connected by a cable normally retracted within the case to the transceiver output to reproduce messages received by the transceiver. To operate the radiotelephone set, the thimble carrying the earphone is pulled away from the case to extend the cable, the thimble then being mounted on the index finger of the hand. The hand is then raised so that the thimble can be inserted by the index finger into an ear of the user who can now hear incoming voice messages. When so raised, the hand acts to place the microphone on the strap adjacent the mouth of the user who can now send out voice messages. Thus the hand of the user and a finger thereon together function to properly orient the microphone and earphone of the set with respect to the mouth and ear of the user.

13 Claims, 2 Drawing Sheets

WRIST-BORNE RADIOTELEPHONE SET

BACKGROUND OF INVENTION

1. Field of Invention

This invention relates generally to mobile radiotelephones useable in cellular telephone systems, and more particularly to a miniature radiotelephone set borne on the wrist of its user.

2. Status of Prior Art

A conventional telephone hand set which is connected to a telephone line includes a generally rectangular case having at one end a mouthpiece housing a microphone and at its other end an earpiece housing an earphone or speaker. To use this set, a user grasping the case in his hand raises the set to place the earpiece against his ear and the mouthpiece adjacent his mouth. Hence with a conventional telephone set it is the shape of the case and its dimensions which act to properly orient the microphone and earphone with respect to the mouth and ear of the user.

A cellular telephone set is a mobile radiotelephone that operates in conjunction with a network of short range microwave transmitters located in overlapping cells throughout a region, calls from a radiotelephone set being switched from one transmitter to the next as the caller enters an adjoining cell. A central station switches the calls and makes connections to regular telephone lines.

A cellular telephone set is constituted by a self-sufficient battery-powered microwave radiotelephone that is usually carried by the user on his person. Hence a cellular telephone set is often in a foldable format to render it more compact when not in use. But whatever its format, a cellular telephone set is provided with a case supporting a mouthpiece at one end and an earpiece at the other, these being spaced apart by the case so that when the case is raised by the user, the earpiece is against the ear of the user and the mouthpiece is then near his mouth.

Thus in a conventional wireless cellular telephone set as in a conventional wired telephone set, it is the case that functions to support the mouthpiece and the earpiece and to space the microphone from the earphone and thereby properly orient these components with respect to the mouth and ear of the user.

The 1989 patent to Olsen U.S. Pat. No. 4,847,818 discloses a wrist-watch radiotelephone useable in a cellular system in which a miniature transceiver is housed in a case strapped onto a wrist of the user. The two piece strap has a pair of strap ends adapted to be connected together for holding the case on the user's wrist. Attached to one strap end is a mouthpiece containing a microphone connected to the input of the transceiver, while attached to the other strap end is an earpiece containing an earphone connected to the transceiver output.

In order to make or receive a call, the user of the Olsen radiotelephone must detach the cased transceiver from his wrist, straighten out the pair of straps and grasp the case and raise it to place the microphone at one strap end adjacent the mouth and to place the earphone at the other strap end against the ear.

While Olsen's wrist-borne radiotelephone obviates the need to carry a much larger mobile radiotelephone set, it has a serious drawback, for each time a call comes in or is to be made, the user must unstrap the radiotelephone from his wrist, and when the call is completed, he must restrap the set on his wrist. The wrist-borne radiotelephone shown in the 1993 patent to Houlihan U.S. Pat. No. 5,260,915 suffers from the same drawback, for to use this radiotelephone it must be taken off the wrist.

Also showing a wrist-borne radiotelephone in a watch format is the 1991 U.S. Pat. No. 5,008,864 to Yoshitake in which the microphone and earphone are mounted on the strap. Hence to use this radiotelephone it must be unstrapped from the wrist.

To provide a wrist-borne radiotelephone set that need not be unstrapped from the wrist in order to be put to use, the 1995 Blonder et al. U.S. Pat. Nos. 5,381,387 discloses an arrangement in which the radiotelephone is secured to the wrist by a strap that encircles the wrist, this wrist strap having a lateral strap extension that extends into the palm of the hand. A microphone is mounted at the junction of the wrist strap and the strap extension, while an earphone is placed at the end of the strap extension so that it lies in the palm of the hand.

In operating the Blonder et al. radiotelephone, the user raises his arm so that his hand is cupped over one ear to bring the earphone next to the ear, the microphone then being proximate to the user's mouth. Similar arrangements are shown in the Blonder et al. U.S. Pat. Nos. 5,499,492 and 5,239,521.

A disadvantage of Blonder et al. wrist-borne radiotelephone sets is that the strap extension carrying the earphone sticks out as an appendage from the strap encircling the wrist. This appendage is subject to being struck and damaged as the user manipulates his arm.

Of greater prior art interest is the 1995 patent to Houlihan U.S. Pat. No. 5,467,324 which provides a wrist-borne radiotelephone set that does not have to be taken off the wrist to be put to use and which has no appendage attached to its strap. In Houlihan, the microphone is mounted on the case housing the transceiver, whereas the earphone is connected to the transceiver by a retractable cable that is pulled out of a reel housed in the case strapped onto the wrist of the user. Hence to use this radiotelephone, the user raises one hand to place the microphone next to his mouth and pulls out the earphone to place the earphone adjacent his ear.

SUMMARY OF INVENTION

In view of the foregoing, the main object of this invention is to provide a miniature radiotelephone set useable in a cellular telephone system that it strapped onto the wrist of a user's hand and is operable to send out voice messages and to receive incoming voice messages without having to unstrap the set from the wrist to do so.

More particularly, an object of this invention is to provide a set of the above type that includes a microphone and earphone in an arrangement in which the hand of the user and a finger thereon serve to properly orient the microphone and earphone with respect to the mouth and ear of the user.

Among the significant advantages of a wrist-borne radiotelephone set in accordance with the invention are the following:

A. The set is dimensionally not much larger than a standard men's wrist watch, yet functions effectively as a much larger conventional cellular telephone set.

B. The wrist-borne radiotelephone set has no appendages; hence when the user who has the set strapped onto his wrist manipulates his arm, in doing so he will cause no injury to the appendage-free set strapped to his wrist.

C. The wrist-borne radiotelephone set, when a call is received or is to be made, can then be quickly put into an operative mode, for all the user need do is to insert a finger of his hand in a thimble carrying the earphone and raise his hand to insert the thimble in one ear, this action placing the earphone into the ear and at the same time placing a microphone mounted on the strap adjacent the mouth of the user.

D. The antenna for the transceiver is incorporated in a retractable cable connecting the earphone to the transceiver output. Hence when the transceiver is put to use by pulling out the cable to place the earphone against the ear, the antenna is then fully extended.

Briefly stated these objects are attained by a radiotelephone set in which a case housing a miniature microwave transceiver is strapped to the wrist of a user's hand, a microphone mounted on the strap being connected to the transceiver input whereby when the hand is raised to bring the microphone adjacent the user, the user can then transmit voice messages. An earphone placed within a finger thimble is connected by a cable normally retracted within the case to the transceiver output to reproduce messages received by the transceiver.

To operate the radiotelephone set, the thimble carrying the microphone is pulled away from the case to extend the cable, the thimble being then mounted on the index finger of the hand. The hand is then raised so that the thimble can be inserted by the index finger into an ear of the user who can now hear incoming voice messages. When so raised, the hand acts to place the microphone on the strap adjacent the mouth of the user who can now send out voice messages. Thus the hand of the user and a finger thereon together function to properly orient the microphone and earphone of the set with respect to the mouth and ear of the user.

BRIEF DESCRIPTION OF DRAWING

For a better understanding of the invention, as well as further features thereof, reference is made to the detailed description thereof to be read in connection with the annexed drawings wherein.

DESCRIPTION OF INVENTION

Figure 1:
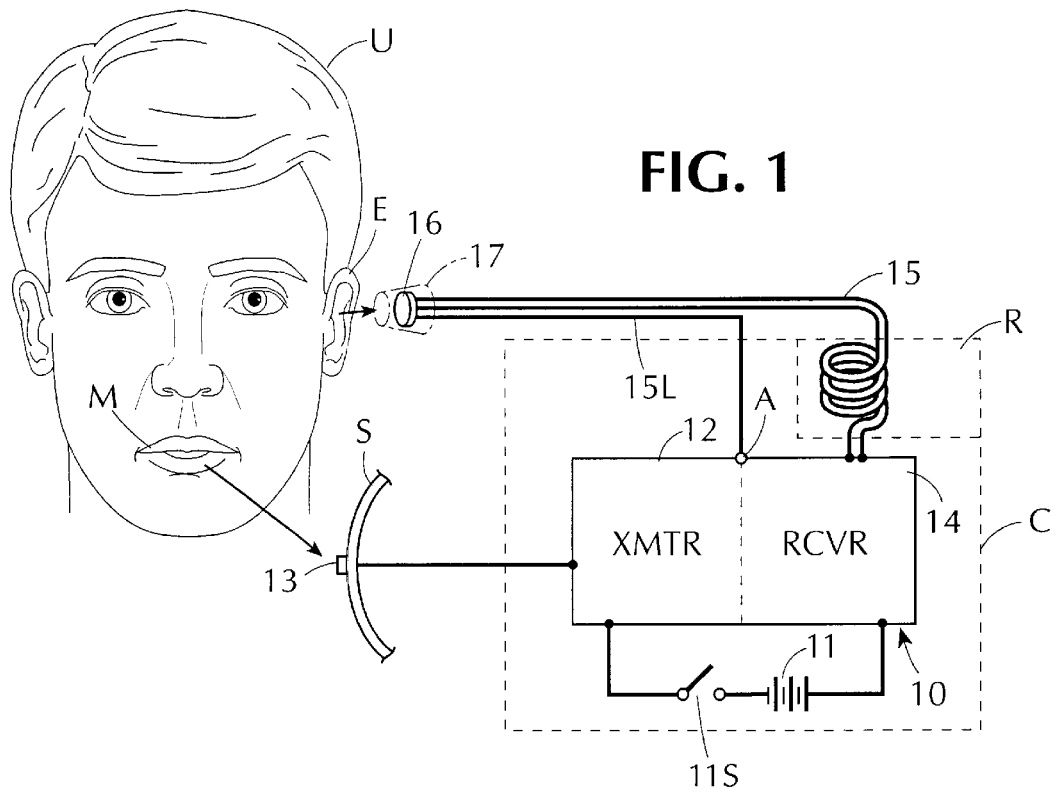
FIG. 1 schematically illustrates the basic components of a wrist-borne radiotelephone set in accordance with the invention and the relationship of its microphone and earphone to the mouth and an ear of the user on whose wrist the set is strapped.

A radiotelephone set in accordance with the invention is strapped on the wrist on a user's hand in the manner of a wristwatch is shown schematically in FIG. 1. The set includes a miniature microwave transceiver 10 housed in a watch case C secured to the wrist of the user by a strap S. The miniature transceiver is fabricated of solid-state integrated circuit chips and is therefore highly compact.

Transceiver 10 is designed to provide two-way mobile microwave telephone communication suitable for a cellular telephone system. The set is powered by a miniature lithium battery 11 housed in a battery compartment within case C so that it can be replaced when exhausted. The battery is connected to transceiver 10, through a power switch 11S functioning to turn off power when the set is not in use.

Figure 4:
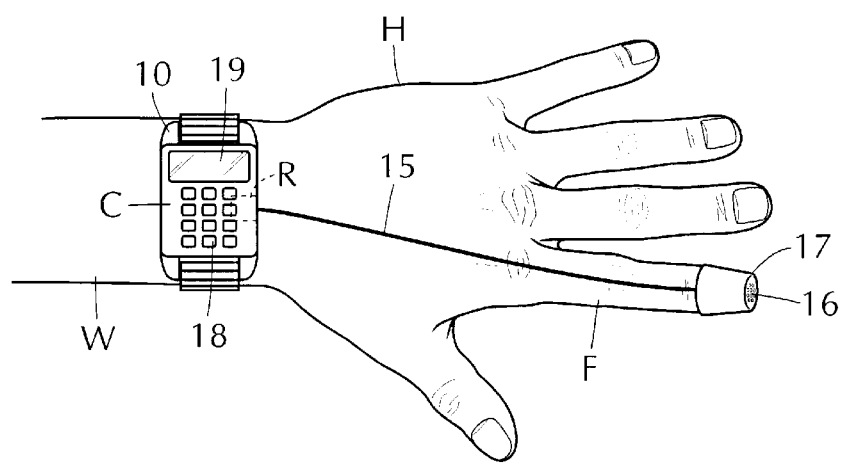
FIG. 4 shows the radiotelephone set strapped onto the wrist of the user's hand, with the thimble fitted on the index finger of the hand.

Transceiver 10 is provided with a microwave transmitter section 12 to whose, audio input is connected a miniature microphone 13 that is mounted on strap S. When the set is worn, the microphone 13 is then next to the inner side of the wrist W encircled by strap S, whereas case 10 housing the transceiver then overlies the outer side the wrist, as shown in FIG. 4.

Figure 5:
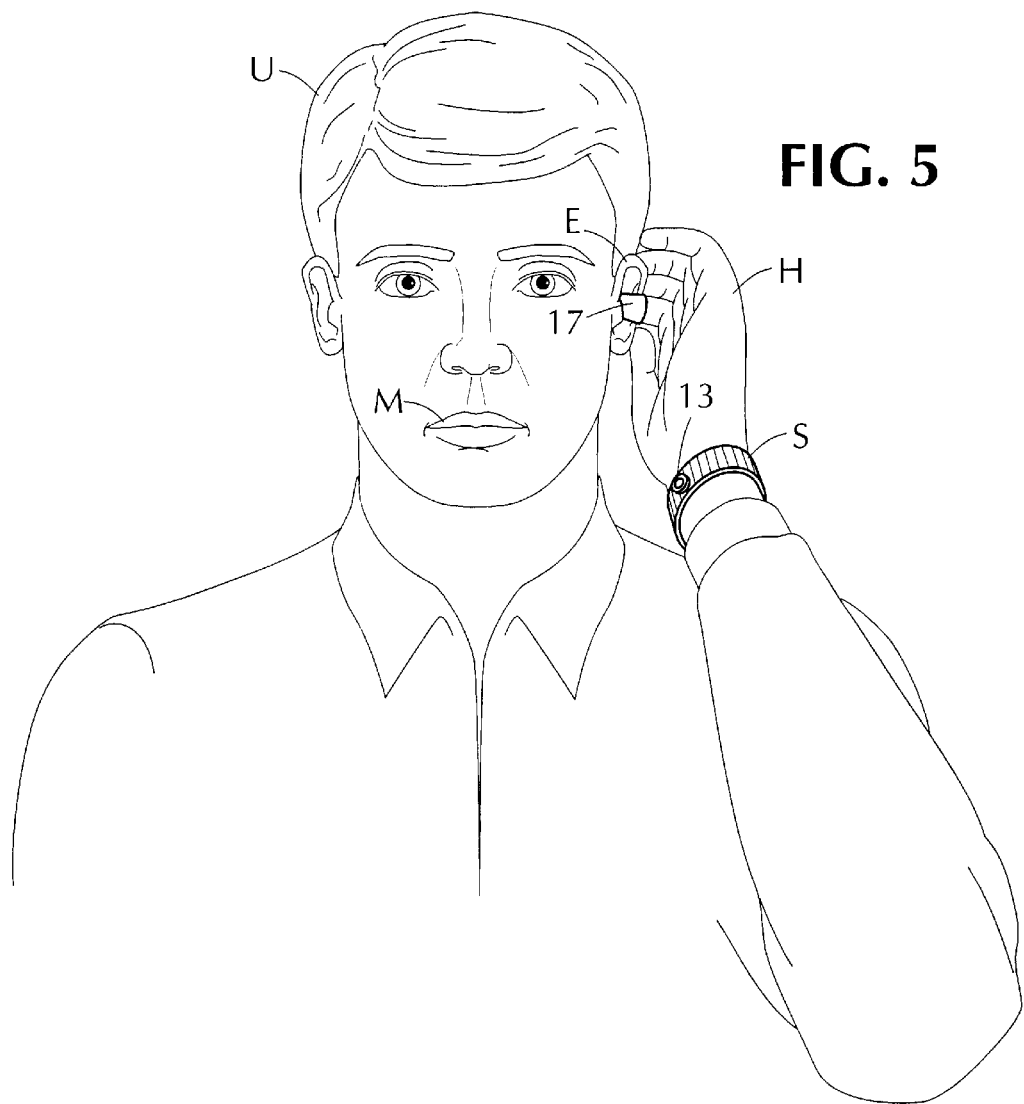
FIG. 5 illustrates the position of the user's hand when operating the radiotelephone set strapped on his wrist.

When the user raises his hand so that his fingers are near one ear E, as shown in FIG. 5, then microphone 13 mounted on strap S is positioned adjacent mouth M of the user U. Voice messages from user U can now be microwave-transmitted to a receiving station in the cellular telephone system.

Transceiver 10 includes a microwave receiver section 14 whose audio output is applied by a flexible cable 15 to a miniature earphone 16 mounted within a finger thimble 17 that is insertable in ear E of user U. Earphone 16 reproduces incoming voice messages received from the cellular system by receiver section 14, these messages being heard by the user through the earphone.

Figure 2:
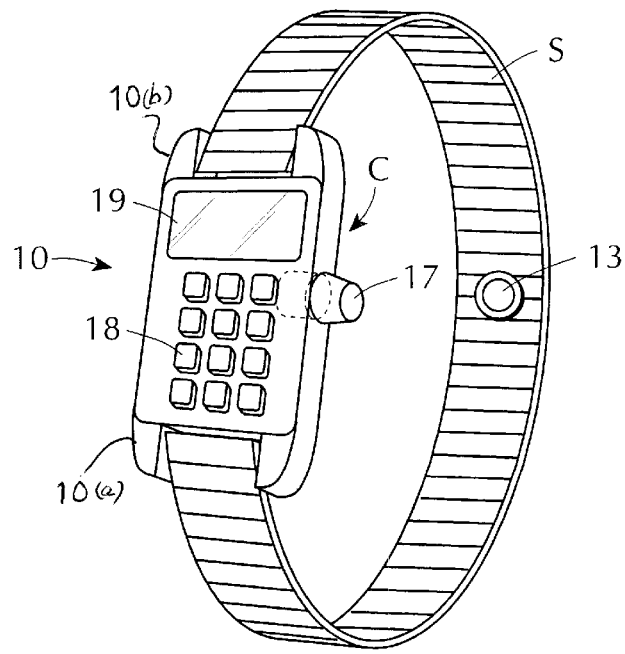
FIG. 2 is a perspective view of the radiotelephone set.
Figure 3:
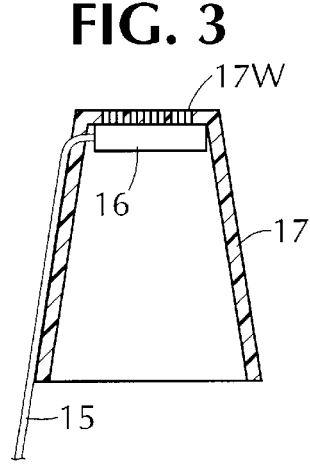
FIG. 3 shows the finger thimble within which the microphone is mounted.

As shown separately in FIG. 2, earphone 16 is in the form of a small button of the type commonly found in a transistor radio earphone. The button is bonded or otherwise secured to the underside of the head 17W of the finger thimble which has a frusto-conical form the head being in the form of a disc at the top of the thimble. The thimble is preferably fabricated of relatively soft, synthetic plastic material, head 17W being perforated to render it sound permeable.

When thimble 17 carrying earphone 16 is fitted over a finger F of hand H of the user (preferably the index finger) and the thimble is inserted by the finger into ear E, the thimble then effectively shields the ear from extraneous sounds, so that the user clearly hears incoming voice messages from the earfone. This feature is important, for cellular telephones are often put to use in very noisy outdoor environments.

Incorporated in cable 15 which is a two wire line connecting earphone 16 to the audio output of receiver section 10, is a third line 15L. This line acts as an antenna for transceiver 10 and is connected to an antenna terminal A.

In practice, one of the two current-carrying lines in cable 15 can also function as the antenna. In that case the selected line is connected to antenna terminal A via a capacitor which passes radio-frequency, but not line currents. In either case, the antenna of the transceiver is extended only when the cable is extended.

Cable 15 which acts as a tether for microphone 16 is wound on a reel rotatable within a reel compartment R within case C, the cable being extendible from the compartment or retractable therein. The spring-loaded reel mechanism for dispensing and retracting cable 15 may operate like a conventional window shade mechanism or like an automatic power cord retractor in a vacuum cleaner.

Since the length of cable 15 is thin and relatively short, for it need only be extended, as shown in FIG. 4, to run from case C strapped on wrist W to finger F on the hand when the cable is wound on the reel within the case, it then occupies relatively little space therein.

FIG. 2 illustrates case C which houses transceiver 10, the case being linked by its end couplers 10a and 10b to strap S which encircles the wrist. In practice, strap S may be a two piece strap with a buckle to join the ends of the pieces, or it may be a resiliently-expandable structure which can be slipped on or off the hand without having to buckle or unbuckle the strap.

But regardless of the structure of the strap, microphone 13 mounted thereon must be connected by a line passing through the strap to the audio input of microwave transmitter section 12. It will be seen in FIG. 2 that thimble 17 which houses earphone 16 is normally held by the retracted cable 15 against the side of case C which faces the fingers of the hand.

The radiotelephone set housed in case 10 is provided with a miniature dialing keyboard 18 mounted on the face of the case, the keys also being useable to carry out control functions. Also provided on the face of case C is a miniature LCD display 19 which exhibits the number being dialed and presents other useful data, such as the time.

Thus the integrated circuit within the case may include an electronic timepiece chip whose time reading is presented on the LCD display when a timing key is pressed. The radiotelephone also includes alarm and paging circuits so that when the user wears the radiotelephone set on his wrist he can hear a ringing signal indicating that he is being called. The ringer for this purpose may be similar to that found in alarm-type wrist watches.

In order to operate the radiotelephone to make or receive a call, the user who has the radiotelephone set strapped on wrist W of his hand H, as shown in FIG. 4, must pull thimble 17 away from the case and put it on the tip of his index finger F. This action extends cable 15 from the case to microphone 15 at the head of the thimble. Hence the microphone connected to the audio input of the transmitter section 12 of transceiver 10 is now placed over the tip of the index finger.

When, as shown in FIG. 5, the user raised his hand to his ear E, he can then insert in his ear with his index finger the microphone-bearing thimble 17. When the user carries out this action, he can also with the other fingers of his hand grasp his head to maintain the raised position of his hand.

When the hand is so positioned, then microphone 13 on strap S encircling wrist W of the user's hand is near mouth M, and the user can speak into the microphone as he listens to the earphone. Hence when operating the radiotelephone set strapped to the wrist of the user, it is the hand and a finger thereon that together act to properly orient microphone 13 and earphone 16 with respect to mouth M and ear E of the user on whose wrist the radiotelephone is strapped.

At the conclusion of a call, thimble 17 is taken off finger F, and cable 15 is automatically retracted to return the thimble to its inactive position against the side of the case. In practice this side of the case may be indented to define a circular well to accommodate the circular base of the thimble so that the thimble is nested in the case and cannot be displaced except to be pulled out.

Associated with cable 15 is a switch (not shown) which has the same function as a hook switch in a standard telephone set, so that when the cable is retracted, the switch disables the set except with respect to its ringing and dialing functions.

The way the user effectively picks up the phone to dial a number or to answer a ring is to pull out the thimble and put it on the tip of his index finger, at which point the set is fully operative.

While there has been shown and described a preferred embodiment of a wrist-borne radiotelephone set, it will be appreciated that many changes and modifications may be made therein without, however, departing from the essential spirit thereof.

I claim:

1. A wrist-borne radiotelephone set comprising:
   A. a case coupled to a strap adapted to engage the wrist on a hand of a user whereby the strip then overlies an inner side of the wrist and the case an outer side thereof;
   B. a miniature microwave transceiver housed in the case having an audio input and an audio output to provide two-way mobile telephone communications;
   C. a microphone mounted on the strap and connected to said audio input whereby when the hand is raised to a position at which the microphone on the strap engaging the wrist is then adjacent the mouth of the user, voice messages from the user may then be transmitted; and
   D. an earphone mounted within a finger thimble and connected by a cable that is retractable within the case to said audio-output, the microphone reproducing telephone voice messages received by the transceiver; said cable when retracted in the case then retaining said thimble against a side of the case whereby to operate the radiotelephone, the thimble is pulled away from the side of the case and fitted onto a finger of the hand, the hand then being raised to a position at which the thimble carrying the earphone can be inserted by the finger in an ear of the user, at which position the microphone is adjacent the mouth whereby the user can speak into the microphone and listen through the earphone, said finger thimble having the earphone mounted therein being dimensioned to be insertable into the ear to effectively shield the ear from extraneous sounds whereby what the ear hears is only sound from the earphone, said finger of the hand being an index finger, and said finger thimble being dimensioned to conform to the index finger so that it is insertable into the ear of the user.

2. A set as set forth in claim 1, in which the transceiver has a transmitter section having an audio input to which the microphone is connected.

3. A set as set forth in claim 1, in which the transceiver has a receiver section having an audio output to which the earphone is connected.

4. A set as set forth in claim 1, in which the transceiver is powered by a lithium battery contained within the case in a battery component.

5. A set as set forth in claim 1, in which the retractable cable is wound on a reel rotatable within a reel compartment in the case, the cable being dispensed and retracted automatically by a spring-loaded mechanism associated with the reel.

6. A set as set forth in claim 1, in which the thimble is sound-permeable with respect to said earphone, but excludes extraneous noises.

7. A set as set forth in claim 6, in which the thimble has a frusto-conical shape provided with a circular head, the microphone being secured to the underside of the circular head.

8. A set as set forth in claim 7, in which the circular head is perforated.

9. A set as set forth in claim 7, in which the thimble is formed of soft synthetic plastic material.

10. A set as set forth in claim 1, in which said radiotelephone set is provided with a miniature dialing keyboard mounted on the face of the case.

11. A set as set forth in claim 10, in which said radiotelephone set is provided with an LCD display mounted on the face of the case.

12. A set as set forth in claim 11, in which also housed in said case is an electronic timepiece chip whose reading is displayed on said LCD display.

13. A set as set forth in claim 1, in which the finger thimble has a frusto-conical form provided with a circular base, whereby when the cable is retracted, the circular base of the thimble is seated in a well in the side of the case.

* * * * *